United States Patent [19]

Hoppough

[11] 4,087,658

[45] May 2, 1978

[54] APPARATUS AND METHOD FOR DETERMINING FREQUENCIES FOR SYSTEM MAXIMUM AND MINIMUM IMMITTANCES

[75] Inventor: Richard Scott Hoppough, Greensboro, N.C.

[73] Assignee: Bell Telephone Laboratories, Incorporated, Murray Hill, N.J.

[21] Appl. No.: 787,849

[22] Filed: Apr. 15, 1977

[51] Int. Cl.² .............................................. H04B 3/46
[52] U.S. Cl. ........................ 179/175.3 R; 324/57 SS
[58] Field of Search .......... 179/175.3 R, 175, 175.3 F; 324/57 SS, 59, 60 R

[56] References Cited

U.S. PATENT DOCUMENTS 3,711,771   1/1973   Hume et al. .................... 324/57 SS

OTHER PUBLICATIONS

"Direct-Reading Swept-Frequency Slotted-Line System with Slope Correction" by Stauffer et al., in IEEE Transactions on Instrumentation and Measurement, vol. IM-23, No. 4, pp. 394-399.

Primary Examiner—Douglas W. Olms
Attorney, Agent, or Firm—H. L. Logan

[57] ABSTRACT

A signal is produced which is representative of the absolute value of the impedance of admittance (i.e., immittance) of a circuit as a function of frequency. At the same time, the frequencies are identified for the local maximum and minimum values of this signal.

4 Claims, 3 Drawing Figures

APPARATUS AND METHOD FOR DETERMINING FREQUENCIES FOR SYSTEM MAXIMUM AND MINIMUM IMMITTANCES

BACKGROUND OF THE INVENTION

1. Field of the Invention

This invention relates to obtaining data for use in determining whether a linear system meets design criteria.

2. Description of the Prior Art

The output of a linear system is the product of the input to the system and the system transfer characteristic. With this in mind systems are constructed to exhibit — as closely as possible — characteristics which result in desired outputs for particular inputs. Loading coils, for example, are added in telephone transmission lines to modify the lines so as to improve the quality of the output.

Notwithstanding attempts to have systems exhibit particular transfer characteristics, such characteristics are not always present because of faulty construction, faulty components, or damage while in shipping, installation or use. It is therefore often necessary to obtain data for use in determining whether the desired characteristics are present.

Data which would be helpful are system poles and zeros. Detailed discussions with respect to poles and zeros are presented in standard textbooks. In brief, system poles and zeros are terms associated with transfer characteristics expressed as Laplace transform functions. In particular, such functions contain the Laplace operator $s$ which represents a complex frequency variable. The values of the operator $s$ which cause the value of a function to go to infinity are called poles. On the other hand the values of the operator $s$ which cause the value of a function to go to zero are called zeros.

Complex frequency variables are, of course, not available in real life and consequently system poles and zeros cannot be specifically identified by testing. However, if the resistive components of a system are relatively small with respect to the reactive components, then poles and zeros can be identified in an approximate manner by testing the system for maximum and minimum impedance or admittance (i.e., immittance) values as a function of frequency. Data so obtained for transmission lines with loading coils, for example, have been found adequate to determine if the desired loading is present.

SUMMARY OF THE INVENTION

An object of the present invention is to identify the frequencies at which a linear system experiences maximum and minimum immittance values.

This and other objects are achieved by producing a voltage versus frequency output wherein the magnitude of the voltage is related to the immittance of a linear system as a function of frequency, by detecting the local peaks and valleys in the magnitude of that voltage and, furthermore, by identifying the frequencies at which these peaks and valleys occur.

One embodiment of the invention comprises apparatus for applying frequency varying sinusoidal voltages to the input terminal of a system and producing an output related to the currents flowing as a result of the sinusoidal voltages. This embodiment further comprises a circuit which identifies the local maximum and minimum points within the apparatus output. Still further the embodiment includes circuitry which identifies the frequencies of the sinusoidal voltages when the local maximum and minimum points are identified.

DETAILED DESCRIPTION

Figure 1:
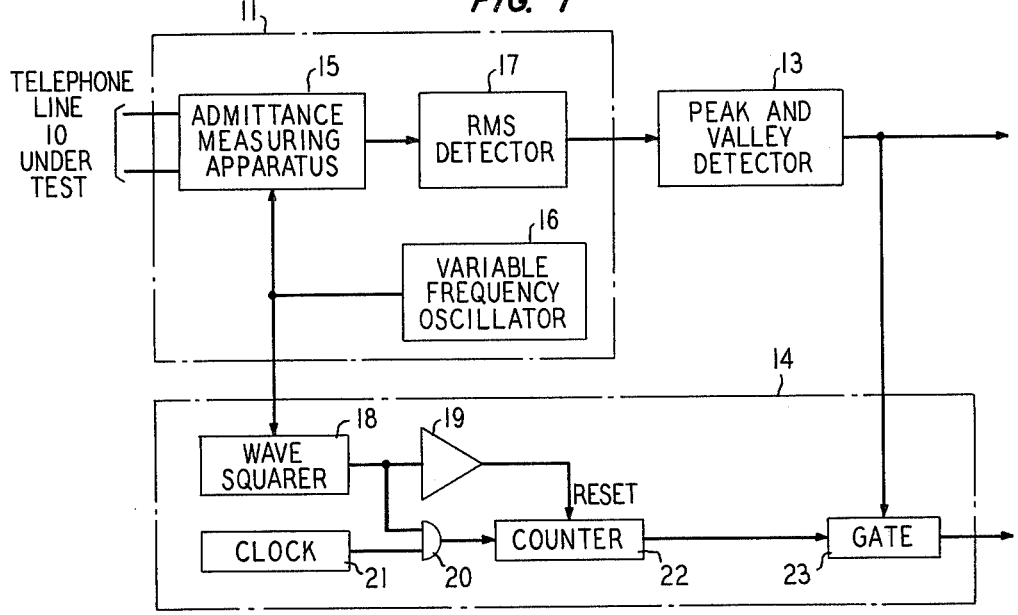
FIG. 1 is a block diagram of a preferred embodiment of the invention.

The embodiment depicted by FIG. 1 comprises apparatus 11 connected to a telephone line 12 to produce, as a function of frequency, an output directly related to the absolute magnitude of admittance of line 12. This output in turn is applied to a peak and valley detector 13. Finally, a frequency identifying circuit 14 is connected between apparatus 11 and detector 13, to produce indications of the frequencies at which the peaks and valleys occur.

Apparatus 11 comprises admittance measuring apparatus 15 which may take the form of the structure disclosed in applicant's copending application Ser. No. 700,333, filed on June 28, 1976 now U.S. Pat. No. 4,028,507, and reproduced in FIG. 2 hereof. When using such structure, apparatus 15 receives the output of a variable frequency oscillator 16 and forces the input terminals of line 12 to these output levels. Furthermore, the output of apparatus 15 is related to the current flowing in line 12 as a result of the voltages forced onto line 12. This output is applied to a conventional RMS detector 17 which produces a dc output related to the RMS value of its input.

Peak and valley detector 13 may take the form of the structure disclosed in applicant's copending application R. S. Hoppough Ser. No. 787,848, filed on even date herewith and reproduced in FIG. 3 hereof. That structure comprises an operational amplifier with a bidirectional nonlinear feedback circuit and a capacitor between its inverting input and ground. The nonlinear feedback circuit is nonconductive until voltages of either polarity thereacross exceed a threshold level. The capacitor is charged and discharged by feedback path current whose polarity and magnitude are dictated by the slope of a signal applied to the noninverting input terminal of the operational amplifier. The feedback path current results in a voltage being developed across the feedback path. This voltage is amplified and clipped so as to shift between two levels depending on the polarity of the current, which as mentioned earlier, is dictated by the slope of the signal applied to the operational amplifier noninverting input terminal. When, therefoe, an input signal of variable amplitude is applied to the noninverting input terminal, an output signal is produced which shifts between two levels in response to each reversal in the slope of the input signal. The transition between these two levels is extracted by a high-pass filter to indicate peaks and valleys in the input signal.

Frequency identifying circuit 14 comprises a wave squarer 18 which produces square waves in response to the sinusoidal output of oscillator 16. The output from wave squarer 18 is applied to both an inverter 19 and AND gate 20. The output from a clock 21 is also applied to AND gate 20. Positive outputs from wave squarer 18 enable AND gate 20 so that pulse outputs from clock 21 are passed to and counted in a counter 22. The negative output of squarer 18 is inverted by inverter 19 and applied to counter 22 to reset it. The maximum count produced each time by counter 22 is therefore representative of the period of the positive output of squarer 18, which of course is inversely related to the immediate frequency of oscillator 16. A gate 23 is connected to both detector 13 and counter 22 and passes the output of counter 22 when peaks and valleys are detected by detector 13. Outputs thus produced represent the frequencies at which the maximum and minimum values of admittance occur for line 12.

Figure 2:
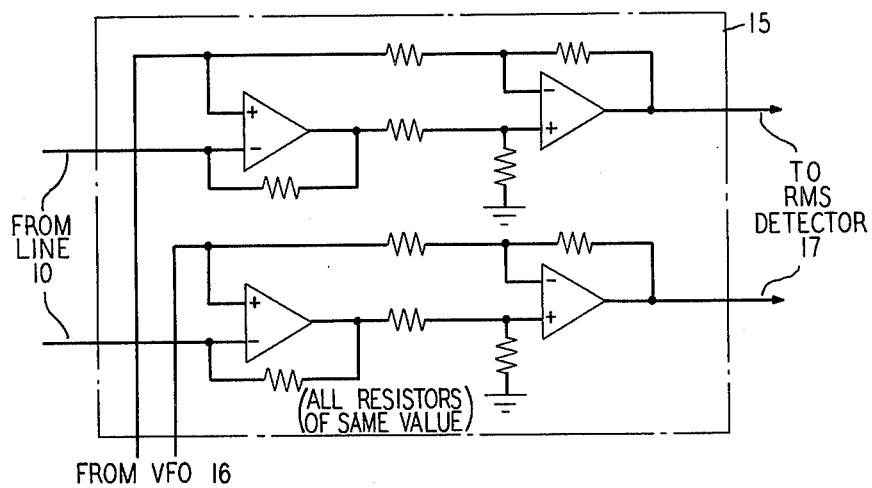
FIG. 2 depicts admittance measuring apparatus which may be used when practicing the invention.
Figure 3:
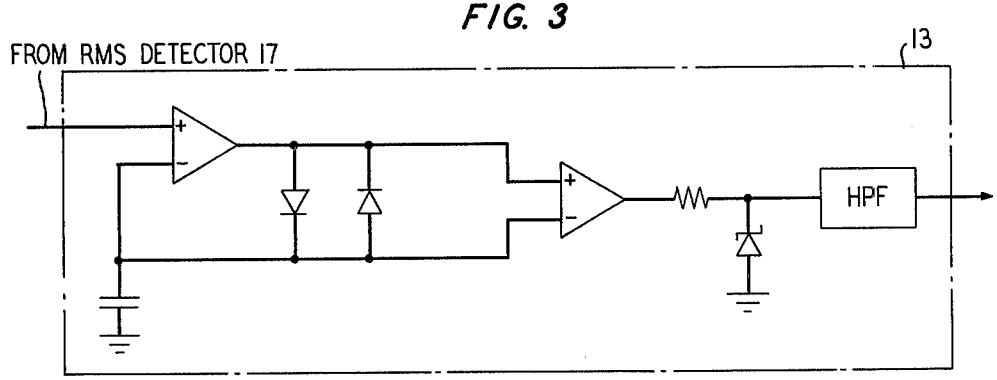
FIG. 3 depicts a peak and valley detector which may be used when practicing the invention.

When using apparatus 15 of FIG. 2, and detector 13 of FIG. 3, detector 13 produces negative pulses for peaks (local maximum values) and positive pulses for valleys (local minimum values) in the output of RMS detector 17. Gate 23 may then comprise a pair of gates connected in parallel to counter 22 and responsive to the negative and positive pulses, respectively. One of the gates therefore produces frequency information for peaks while the other produces such information for valleys. (As appreciated by those skilled in the art, other configurations may be employed to correlate peak and valley pulses and the output of counter 22.) Peak-produced frequency information is related to the "zeros" of line 10 while valley-produced frequency information is related to the "poles" of line 10. (The opposite relationship exists when using impedance measuring apparatus.) Peak and valley frequency information is of course produced in an alternating order as there must always be a valley between a pair of peaks and a peak between a pair of valleys.

What is claimed is:

1. Apparatus for identifying the local maximum and minimum points in the immittance vs. frequency characteristic of a circuit, said apparatus comprising first means for connection to said circuit for producing an output representative of the absolute magnitude of the immittance of said circuit as a function of frequency, second means connected to said first means for detecting the occurrence of local maximum and minimum points in said output, and third means connected between said first and second means to produce an output indicative of the frequency at the times said maximum and minimum points are detected.

2. Apparatus in accordance with claim 1 in which said first means comprises a variable frequency oscillator, an RMS detector, and immittance measuring apparatus connected to said variable frequency oscillator and having input terminals for connection to said circuit and, furthermore, having output terminals connected to said RMS detector.

3. Apparatus in accordance with claim 2 in which said immittance measuring apparatus responds to said oscillator to force the potential between its input terminals to particular levels and, furthermore, responds to the current flowing between its input terminals to produce an output which is linearly related to said current.

4. A method for identifying the local maximum and minimum points in the immittance vs. frequency characteristic of a circuit, said method comprising the steps of producing an output representative of the absolute magnitude of the immittance of said circuit as a function of frequency, detecting the occurrence of local maximum and minumum points in said output, and producing an output indicative of the frequency at the times said inflection points are detected.

* * * * *